United States Patent [19]

Tamamushi

[11] Patent Number: 4,489,660
[45] Date of Patent: Dec. 25, 1984

[54] FOLDABLE PANEL FOR STORAGE SPACE OF AN AUTOMOTIVE VEHICLE OR THE LIKE

[75] Inventor: Masahiro Tamamushi, Machida, Japan

[73] Assignee: Nissan Motor Company, Limited, Yokohama, Japan

[21] Appl. No.: 378,626

[22] Filed: May 17, 1982

[30] Foreign Application Priority Data

May 27, 1981 [JP] Japan ............................ 56-79142

[51] Int. Cl.³ ............................................. A47B 23/00
[52] U.S. Cl. ........................................ 108/44; 16/225
[58] Field of Search .................. 297/15; 428/256; 160/84 R, 217, 230, 231 R, 379; 296/1 C, 37.5, 37.14, 37.16; 16/DIG. 13, 223, 225, 251, 250, 357; 108/44; 312/330 SM

[56] References Cited

U.S. PATENT DOCUMENTS 3,222,437  12/1965  Schilling ........................ 16/225 X
3,445,052   5/1969  Lewallen ..................... 16/DIG. 13
3,731,449   5/1973  Kephart, Jr. ................... 428/256 X
3,870,391   3/1975  Nims ............................... 312/297
4,231,135  11/1980  Fradin ............................. 16/225

FOREIGN PATENT DOCUMENTS 1573884  7/1969  France .
 295870  3/1954  Switzerland .
1331808  9/1973  United Kingdom .
2022029  9/1982  United Kingdom .

Primary Examiner—James T. McCall
Attorney, Agent, or Firm—Thompson, Birch, Gauthier & Samuels

[57] ABSTRACT

The present invention features a parcel shelf wherein front and rear panels are formed from the same sheet of material and are divided by a channel-like groove formed across the sheet. The groove defines a thin flexible web-like portion which acts a hinge for the panels. A decorative cover is disposed on the upper surface of the panels.

3 Claims, 12 Drawing Figures

FOLDABLE PANEL FOR STORAGE SPACE OF AN AUTOMOTIVE VEHICLE OR THE LIKE

BACKGROUND OF THE INVENTION

1. Field of the Invention

The present invention relates generally to a foldable parcel shelf for a "hatch-back" type vehicle or the like and more specifically to a foldable panel which obviates deterioration of the panel covering along the portion thereof which is flexed during folding of the panel.

2. Description of the Prior Art

In a previously proposed arrangement, such as shown in FIGS. 1 to 6 of the drawings, separate front and rear panels 1, 2 are hingedly interconnected via hinge members 3 which each have a pair of parallel spindles 4, 5 rotatably received in tubular envelopes 6, 7 fixed to each of the panels. A relatively thick carpet or decorative cover 8 is fixed to the surface of the panels via a suitable adhesive. As best seen in FIG. 3, the spindles 4, 5 extend from a base member 9 which has a triangular shape and which is adapted to be received in a semi-circular recess formed in structural members 10 located along either side of the panels 1 and 2. To additionally maintain the hinge members 3 in position when the panels are not being lifted, a pin 11 is adapted to engage in a suitable groove formed in the associated structural member 10.

With this arrangement, when the rear panel 2 is lifted, the axis of rotation thereof is defined by the spindles 5, while when the front panel 1 is lifted, the axis of rotation thereof is defined by the spindles 4.

However, a drawback has been encountered in that a substantial predetermined distance "H" must be provided between the inboard edges of the spindle receiving envelopes 6, 7 to allow for the folding action illustrated in FIG. 6 and the thickness of the decorative cover 8 itself. This gap causes a zone wherein the upper decorative cover 8 is unsupported and may be stretched down into the gap because of loads placed thereon or frequent folding. This of course detracts from the appearance of the arrangement as a whole and hastens the time at which the cover will split and/or tear.

A further example of prior art essentially the same as that described hereinabove may be found in U.S. Ser. No. 41,771, now U.S. Pat. No. 4,351,555 to which reference is hereby made.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 8:
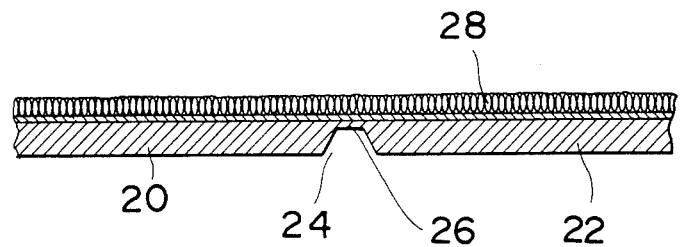
FIG. 8 is a schematic elevation showing a part of the preferred embodiment of the present invention.
Figure 9:
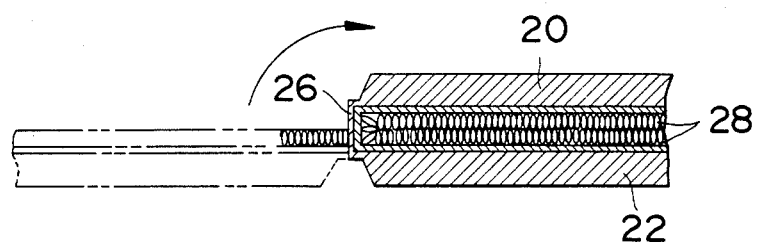
FIG. 9 is a view similar to that of FIG. 8 but showing the panel folded.

Turning now to FIGS. 8 and 9, a panel construction which characterizes the invention is shown. In this arrangement the front and rear panels 20, 22 are formed of the same sheet of material which in this case is preferably a thermo-plastic resin. A channel-like recess 24 is formed across the sheet to separate the front and rear panels and define a thin web-like portion 26 which interconnects same. Fused onto the upper surface of the sheet is a suitable decorative cover 28. The thin strip or web 26 interconnecting the front and rear panels acts as a hinge and allows for the arrangement to be folded as shown in FIG. 9.

Figure 10:
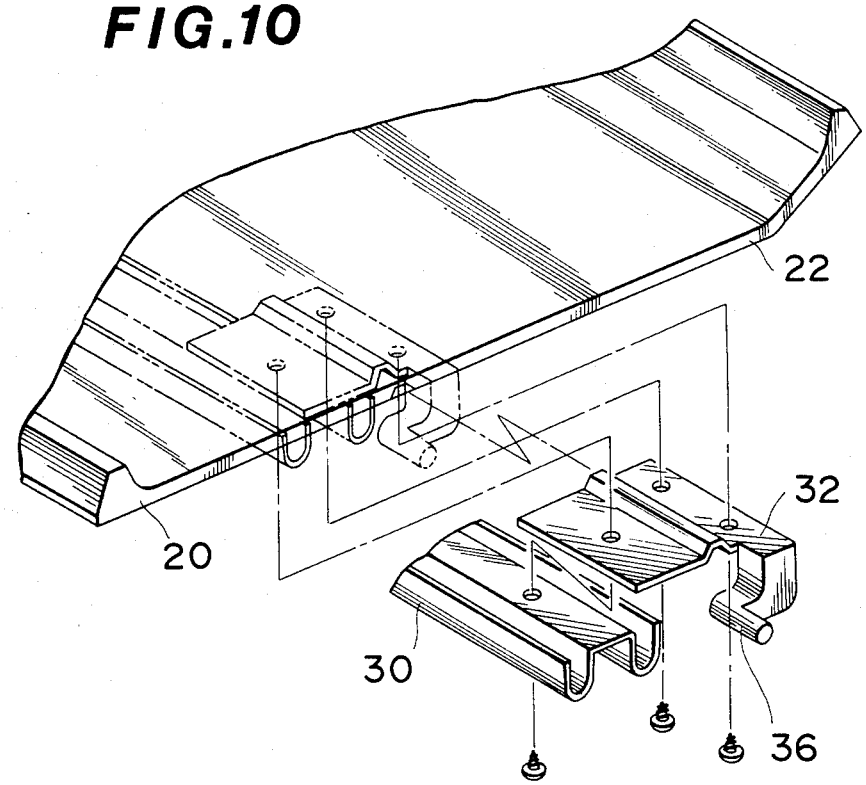
FIG. 10 is an exploded perspective view of the preferred embodiment of the present invention.

FIG. 10 shows the panel illustrated in FIGS. 8 and 9 provided with a metallic reinforcing strip 30 attached to the front panel 20 by self tapping screws, and hinge reinforcing members 32 formed of a suitable plastic such as polypropylene, at each end of the channel 24. The metallic reinforcing strip 30 is adapted to extend across the width of the front panel and preferably seat on the structural members 34 provided adjacent either side of the panel so as to support the front panel 20 when in the closed position. A second reinforcing strip may be fixed to the rear panel 22 to increase the degree of rigidity of the arrangement and to increase the load bearing capacity of the structure.

As shown, each plastic reinforcing member 32 has a stepped portion adapted to be received in the recess 24 and which is thin enough to permit flexure thereof when either one of the front or rear panels is lifted. Each member 32 is further formed with a pin 36 which extends outwardly toward a structural member 34 but which does not extend beyond the shadow of the panel to which it is attached.

Figure 12:
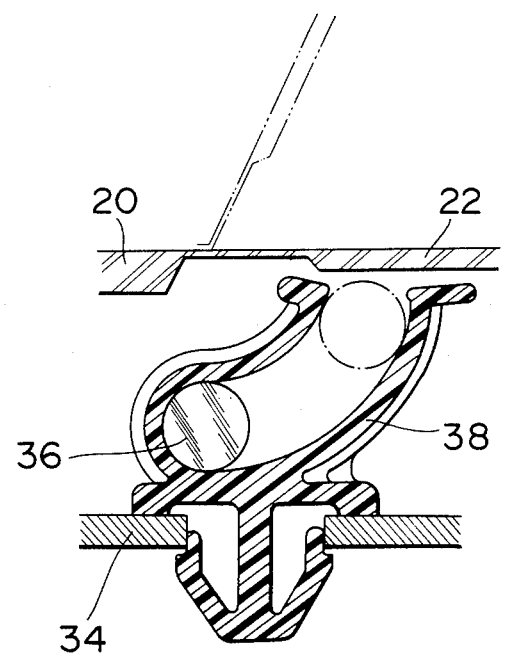
FIG. 12 is an elevation of a guide member which cooperates with the pin shown in FIGS. 10 and 11.

FIG. 12 shows a guide member 38 which may advantageously be formed of a similar plastic as the reinforcing member and which is secured to the structural member 34 in a position that the pin 36 will slide therein as the rear panel is lifted through an initial predetermined angle.

Figure 11:
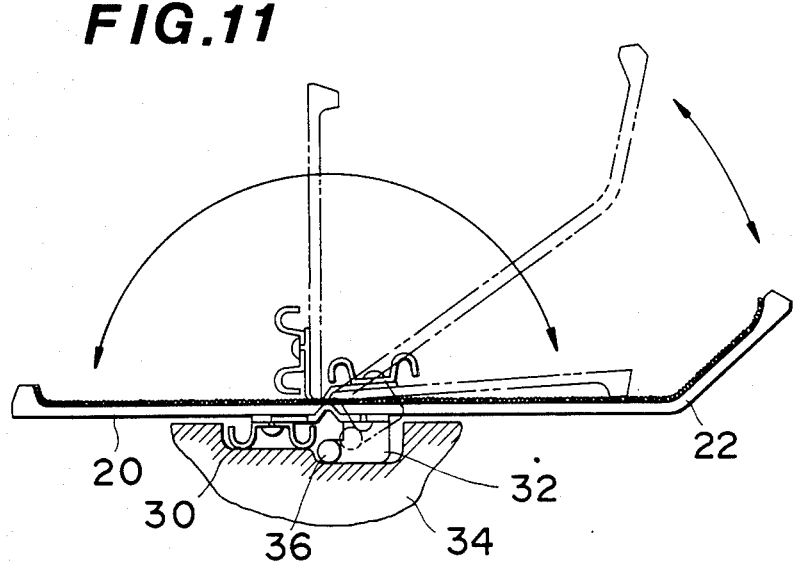
FIG. 11 is an elevation of the arrangement shown in FIG. 9.

With this arrangement, the front and rear panels 20, 22 may be opened as indicated by the arrows in FIG. 11.

Figure 1:
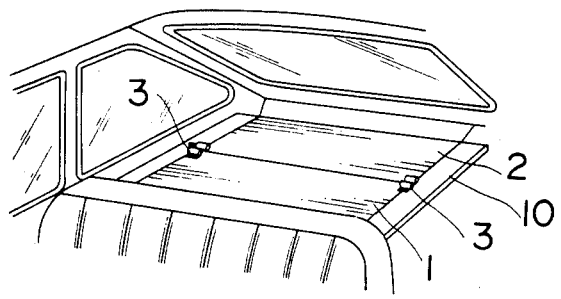
FIG. 1 is a perspective view showing the prior art arrangement discussed in the opening paragraphs of the disclosure disposed within a hatchback type vehicle.
Figure 2:
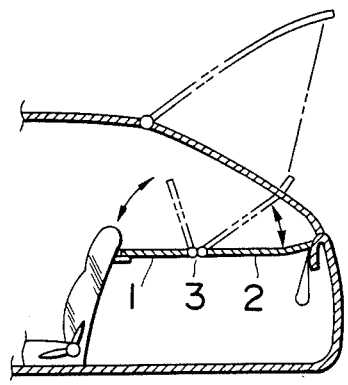
FIG. 2 is a sectional elevation of the arrangement shown in FIG. 1.
Figure 3:
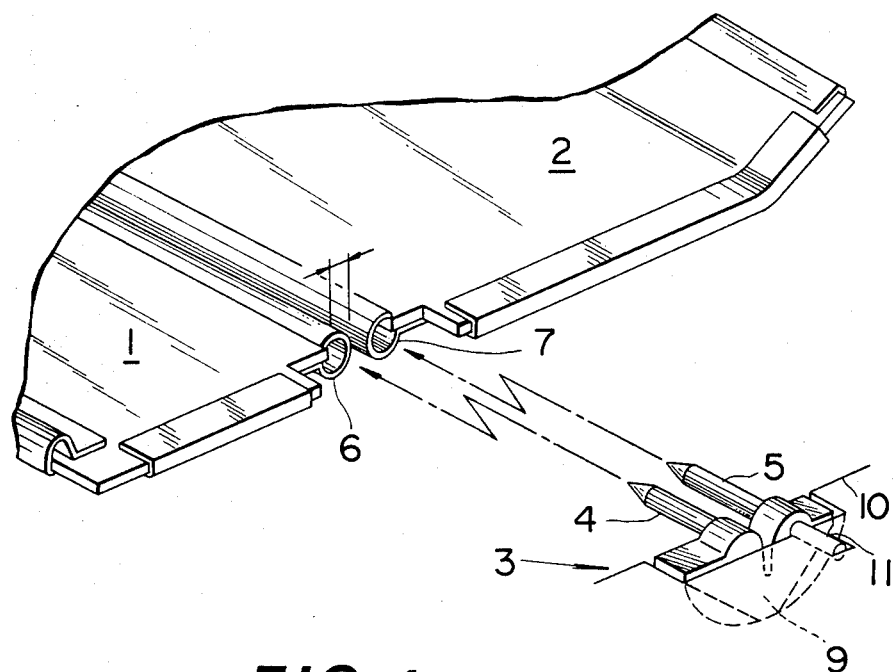
FIG. 3 is a partly exploded perspective view of the aforementioned prior art.
Figure 4:
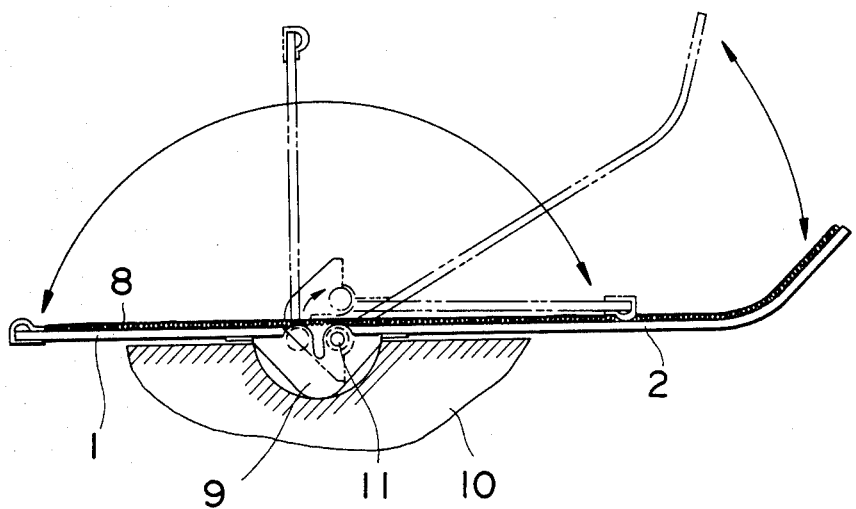
FIG. 4 is an elevation of the arrangement shown in FIG. 3.
Figure 5:
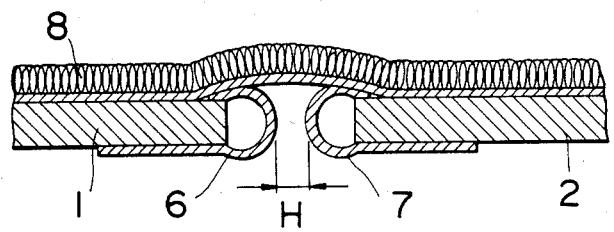
FIG. 5 is a partial schematic elevation showing the front and rear panels, pin receiving envelopes and decorative cover of the prior art arrangement.
Figure 6:
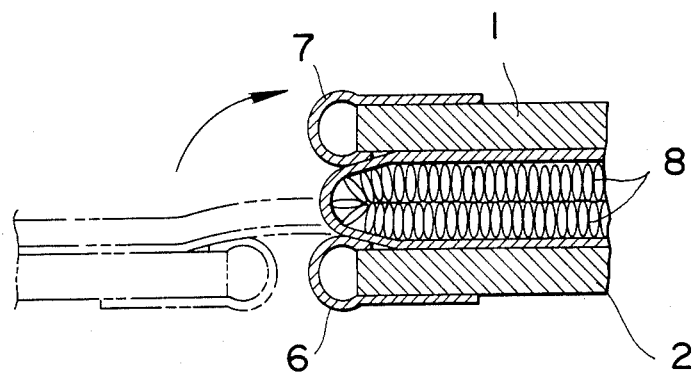
FIG. 6 is a view similar to that of FIG. 5 but showing the panel folded.
Figure 7:
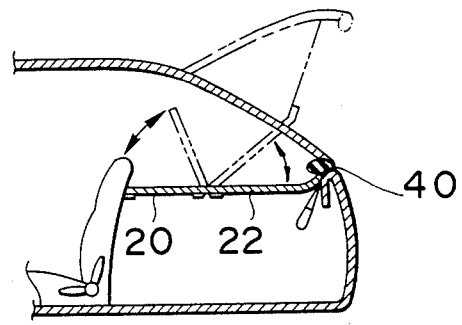
FIG. 7 is a view similar to that of FIG. 2, but showing a parcel shelf according to a preferred embodiment of the present invention.

To secure the front panel 20 in position when the rear panel 22 is being lifted, a suitable clip may be provided thereon. Furthermore, to secure the rear panel 22 in position when the rear door of the vehicle is closed, an elastomeric window seal 40 which holds the rear window glass in position (see FIG. 7) may be adapted to seat on the endmost edge of the rear panel to secure same in position.

Further, the rear panel may be connected to the rear door via a suitable cable so as to be lifted simultaneously with the rear door.

What is claimed is:

1. A parcel shelf for a vehicle comprising:
   (a) a sheet;
   (b) means defining a recess extending across said sheet, said recess means dividing said sheet into a first panel and a second panel interconnected by a thin flexible portion;
   (c) a reinforcing strip fixed to and extending across said first panel; and
   (d) a pair of reinforcing members fixed to said first and second panels at the ends of said recess means, each of said reinforcing members having a stepped portion sized and shaped to be received in said recess means.

2. A parcel shelf as claimed in claim 1, wherein each of said reinforcing members has a pin formed thereon; and a pair of guide members, each of said guide members being attached to a stationary structural member which is located adjacent said second panel, each of said guide members retaining a pin therein as said second panel is rotated through a predetermined angle with respect to said stationary structural member.

3. A parcel shelf as claimed in claim 1, further having a decorative cover on the surface of said sheet, said recess being sufficiently wide to accommodate the combined thicknesses of said sheet and said decorative cover and to permit said first and second panels to be folded back one over the other.

* * * * *